United States Patent
Satpathy et al.

(10) Patent No.: US 11,838,813 B1
(45) Date of Patent: Dec. 5, 2023

(54) EFFICIENT RADIO ACCESS TECHNOLOGY OFFLOADING WITHOUT DEDICATED MEASUREMENT REPORT

(71) Applicant: T-Mobile USA, Inc., Bellevue, WA (US)

(72) Inventors: Suchit Satpathy, Parsippany, NY (US); Muhammad Tawhidur Rahman, Sammamish, WA (US); Nishant Patel, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 98 days.

(21) Appl. No.: 17/576,892

(22) Filed: Jan. 14, 2022

(51) Int. Cl.
*H04W 36/18* (2009.01)
*H04W 36/00* (2009.01)

(52) U.S. Cl.
CPC ... *H04W 36/0079* (2018.08); *H04W 36/0022* (2013.01); *H04W 36/0058* (2018.08); *H04W 36/0077* (2013.01); *H04W 36/00837* (2018.08)

(58) Field of Classification Search
CPC combination set(s) only.
See application file for complete search history.

(56) References Cited

U.S. PATENT DOCUMENTS

2020/0154333 A1* 5/2020 Paladugu ............. H04B 7/0602
2021/0051530 A1* 2/2021 Venkataraman ...... H04W 88/06

* cited by examiner

*Primary Examiner* — Anez C Ebrahim
(74) *Attorney, Agent, or Firm* — Barta, Jones & Foley, PLLC

(57) ABSTRACT

Solutions for early cellular offloading include: receiving, at a node of a wireless network, from a user equipment (UE), a first message (e.g., an A3, A5, B1, or B2 event report) containing information regarding a serving cell of a first wireless technology generation and information regarding a neighbor cell of the first wireless technology generation (e.g., reference signal receive power (RSRP), reference signal received quality (RSRQ), or signal to interference and noise ratio (SINR) measurement for fifth generation cellular technology (5G)); determining that a handover to the neighbor cell will not be performed; and based on at least the information regarding the serving cell and determining that the handover to the neighbor cell will not be performed, triggering an offload from the serving cell to a cell of a second wireless technology generation (e.g., fourth generation cellular technology (4G)).

20 Claims, 6 Drawing Sheets

EFFICIENT RADIO ACCESS TECHNOLOGY OFFLOADING WITHOUT DEDICATED MEASUREMENT REPORT

BACKGROUND

A user equipment (UE), such as a cellular phone, that is registered to a wireless network, measures received signal quality (e.g., a power level) of the signal from its serving cell and often also measures received signal quality of the signal from a neighbor cell. When the received signal quality of the signal from the neighbor cell exceeds the received signal quality of the signal from the serving cell, by a predetermined threshold level, the UE will send a message, such as an A3 event report, to the network. The network interprets this event report message as a handover request to the neighbor cell. Due to network loading (e.g., the neighbor cell is already heavily loaded) and other constraints, the handover may not occur.

Multiple scenarios exist that result in the received signal quality of the signal from the neighbor cell exceeding the received signal quality of the signal from the serving cell, including that the received signal quality of the signal from the serving cell is poor. However, the UE, which may be visiting from another network, may be configured to repeatedly send the same event report message (the handover request) prior to changing to a different A2 event report that is used as a trigger for offloading the UE to a different wireless technology generation, such as from a fifth-generation cellular technology (5G) cell to a fourth-generation cellular technology (4G) cell. During this delay, the UE may lose connectivity from the serving cell (e.g., drop a call), degrading the user experience. Additionally, even if a call is not dropped (e.g., the UE is only using data), the data throughput will suffer, since a lower data rate modulation and coding scheme must be used, and/or a high bit error rate will require retransmissions.

SUMMARY

The following summary is provided to illustrate examples disclosed herein but is not meant to limit all examples to any particular configuration or sequence of operations.

Solutions for early cellular offloading include: receiving, at a node of a wireless network, from a user equipment (UE), a first message (e.g., an A1, A2, A3, A4, A5, A6, B1, B2, or any new standardize event reporting in future) containing information regarding a serving cell of a first wireless technology generation and information regarding a neighbor cell of the first wireless technology generation (e.g., reference signal receive power (RSRP), reference signal received quality (RSRQ), or signal to interference and noise ratio (SINR) measurement for fifth generation cellular technology (5G)); determining that a handover to the neighbor cell will not be performed; and based on at least the information regarding the serving cell and determining that the handover to the neighbor cell will not be performed, triggering an offload from the serving cell to a cell of a second wireless technology generation (e.g., fourth generation cellular technology (4G)). In some cellular network arrangements, A3, A5, B1, and B2 event reports are handled as a handover request. A2 event reports may trigger an offload from 5G to 4G, but typically follow A3, A5, B1, and B2 event reports by a considerable length of time. Responding to an A3, A5, B1, or B2 event report as an A2 report (after determining not to perform a handover to another 5G cell), saves time by starting the offloading to 4G earlier, possibly preventing a dropped call.

BRIEF DESCRIPTION OF THE DRAWINGS

The disclosed examples are described below with reference to the accompanying drawing figures listed below, wherein.

Figure 1:
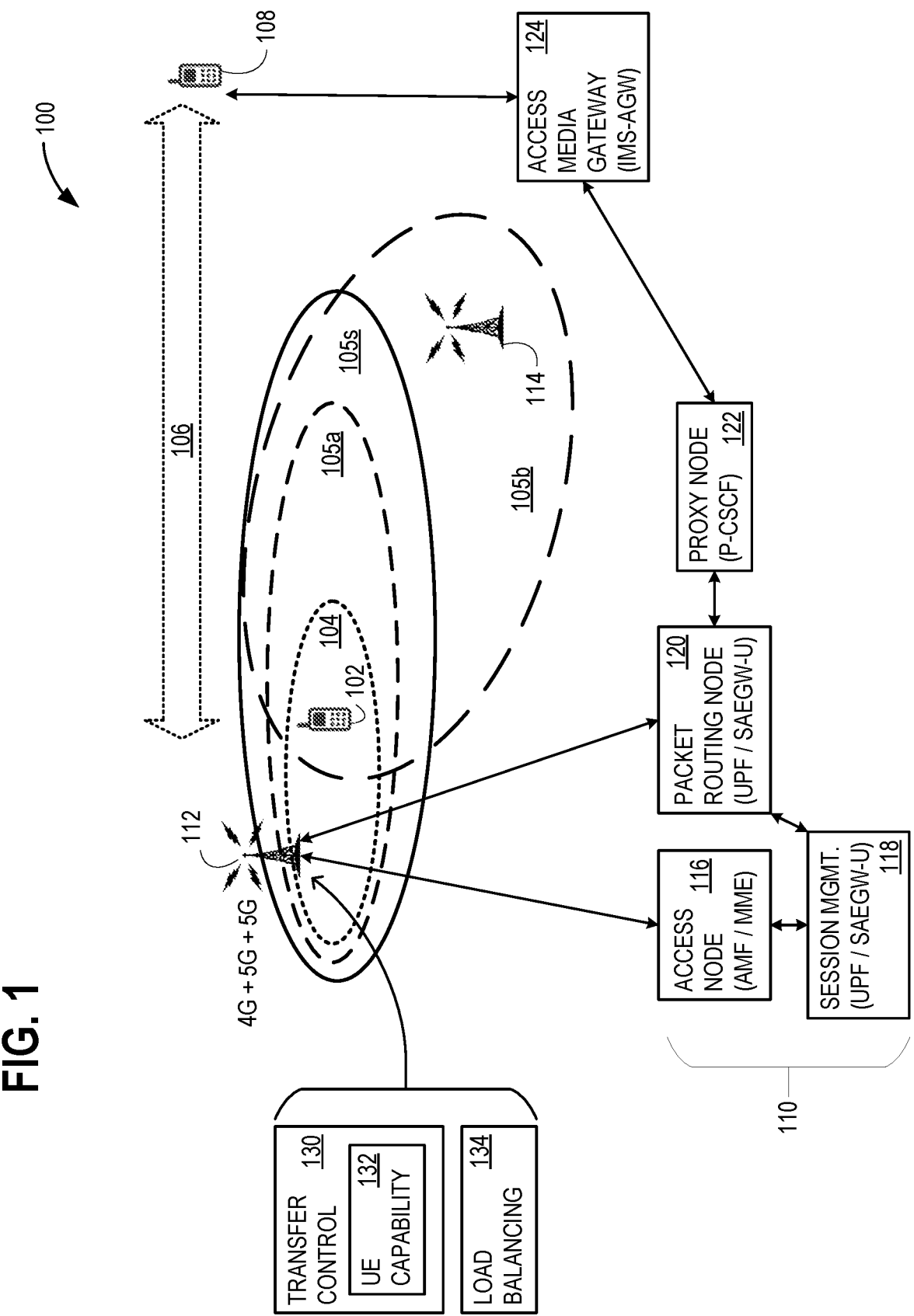
FIG. 1 illustrates an exemplary arrangement that advantageously performs early cellular offloading on a handover request.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for early cellular offloading include: receiving, at a node of a wireless network, from a user equipment (UE), a first message (e.g., an A3, A5, B1, or B2 event report) containing information regarding a serving cell of a first wireless technology generation and information regarding a neighbor cell of the first wireless technology generation (e.g., reference signal receive power (RSRP), reference signal received quality (RSRQ), or signal to interference and noise ratio (SINR) measurement for fifth generation cellular technology (5G)); determining that a handover to the neighbor cell will not be performed; and based on at least the information regarding the serving cell and determining that the handover to the neighbor cell will not be performed, triggering an offload from the serving cell to a cell of a second wireless technology generation (e.g., fourth generation cellular technology (4G)).

In some cellular network arrangements, A3, A5, B1, and B2 event reports are handled as a handover request. A2 event reports may trigger an offload from 5G to 4G, but typically follow A3, A5, B1, and B2 event reports by a considerable length of time. Responding to an A3, A5, B1, or B2 event report as an A2 report (after determining not to perform a handover to another 5G cell), saves time by starting the offloading to 4G earlier (transferring the UE to a different layer), possibly preventing a dropped call.

Aspects of the disclosure improve the robustness, resilience, and reliability of wireless communications, improving user experience, by offloading UEs from one cellular technology generation (e.g., 5G) to another cellular technology generation (e.g., 4G) early—such as when the UE is initially requesting a handover—rather than waiting for the UE to send another event report that corresponds to a request for offloading. Specifically, aspects of the disclosure trigger an offload from the serving cell to a cell of a second wireless technology generation, based on at least receiving information regarding the serving cell (e.g., indicating that the received signal measurement for the serving cell is below an offloading threshold) and determining that a handover to a neighbor cell will not be performed. This saves time for the UE, when the UE would otherwise be transmitting only the handover request, during which a potential call drop may be avoided.

Although, in general situations, a voice over new radio (VoNR) call on 5G may be preferable to a voice over long-term evolution (VoLTE) call on 4G, continuing a VoNR call uninterrupted, by moving to VoLTE, provides an improved user experience over retaining the call as VoNR and experiencing a call drop. 4G is also referred to as long term evolution (LTE), and 5G is also referred to as new radio (NR). When a new cellular technology generation, such as sixth generation cellular technology (6G) is being rolled out, and 5G is the older, more heavily-deployed cellular technology generation, aspects of the disclosure will improve user experience for 6G (and even later new technology roll-outs).

FIG. 1 illustrates an exemplary arrangement 100 that advantageously performs early cellular offloading by a wireless network 110 on a handover request from a UE 102. Wireless network 110 comprises a gNodeB (gNB) 112, other gNBs co-located with gNB 112, a gNB 114, an access node 116, a session management node 118, a packet routing node 120, and a proxy node 122. In 5G, access node 116 may be an access mobility function (AMF), session management node 118 may be a session management function (SMF), and packet routing node 120 may be a user plane function (UPF). In 4G, access node 116 may be a mobility management entity (MME), session management node 118 may be a system architecture evolution (SAE) gateway-control plane (SAEGW-C), and packet routing node 120 may be an SAE gateway-user plane (SAEGW-U). Proxy node 122 may be a proxy-call session control function (P-CSCF).

As depicted in FIG. 1 UE 102 is in the vicinity of gNB 112 and is being served by a 5G cell 105s. Other cells (e.g., layers of service) are provided by co-located base stations (e.g., other gNBs): a 4G cell 104 and another 5G cell 105a at a different frequency band. In the position of UE 102 relative to gNB 112, as shown, UE 102 may be served by any one of cells 104, 105a, and 105s. Another gNB 114 provides a 5G neighbor cell 105b close enough that UE is able to measure the received signal quality of neighbor cell 105b from gNB 114. Cell 104 provides an offloading opportunity for UE 102 (e.g., transferring UE 102 to a 4G cell, rather than handing UE 102 off to another 5G cell).

UE 102 is shown as having an ongoing voice call 106 with another UE 108. Voice call 106 flows from gNB 112 as a packet data traffic session through packet routing node 120, and proxy node 122, to an internet protocol (IP) multimedia system (IMS) access gateway (IMS-AGW) 124. Access node 116 and session management node 118 provide management of data traffic sessions (including voice calls) for UE 102.

A transfer control 130 handles handovers, redirections, and offloading, for example, moving UE 102 from being served by cell 105s to being served by one of other cells 104, 105a or 105b. In order to manage handoffs and offloading, transfer control 130 determines the capabilities of UE 102 from UE capability information 132, such as that UE 102 has both 4G and 5G capability (and later, 6G capability, when such UE's become available). UE 102 provides UE capability information 132 in a UECapabilityInformation Indication message, which identifies the capability of UE 102 with respect to cellular technology generation (e.g., 4G and 5G) and frequency bands, among other information.

Transfer control 130 may be located within gNB 112 or another node within wireless network 110. UE capability information 132 is stored in gNB 112 and/or access node 116. UE 102 may be assigned to a specific cell based, in part, on UE capability information 132. For example, in addition to differences between 4G and 5G, different cells within 4G and 5G are distinguished by frequency and duplex mode. There are currently dozens of different bands among 4G and 5G, using various center frequencies, duplexing, and bandwidths. For example, an n41 5G band uses time-division duplexing (TDD) at 2500 megahertz (MHz), whereas an n71 5G band uses frequency-division duplexing (FDD) at 600 MHz.

Since gNB 112 and 114 may serve a large number of other UEs, load balancing 134 attempts to minimize the likelihood that one of the cells (layers) is overloaded and can steer an incoming UE away from a heavily loaded cell. Thus, it is possible, that if cell 105a or cell 105b is overloaded (e.g., already loaded above 70%) when UE 102 requests a handover to one of those other cells, the handover will not be permitted. Transfer control 130 uses load balancing 134 in determining whether to permit handovers, redirections, and offloading.

Figure 2:
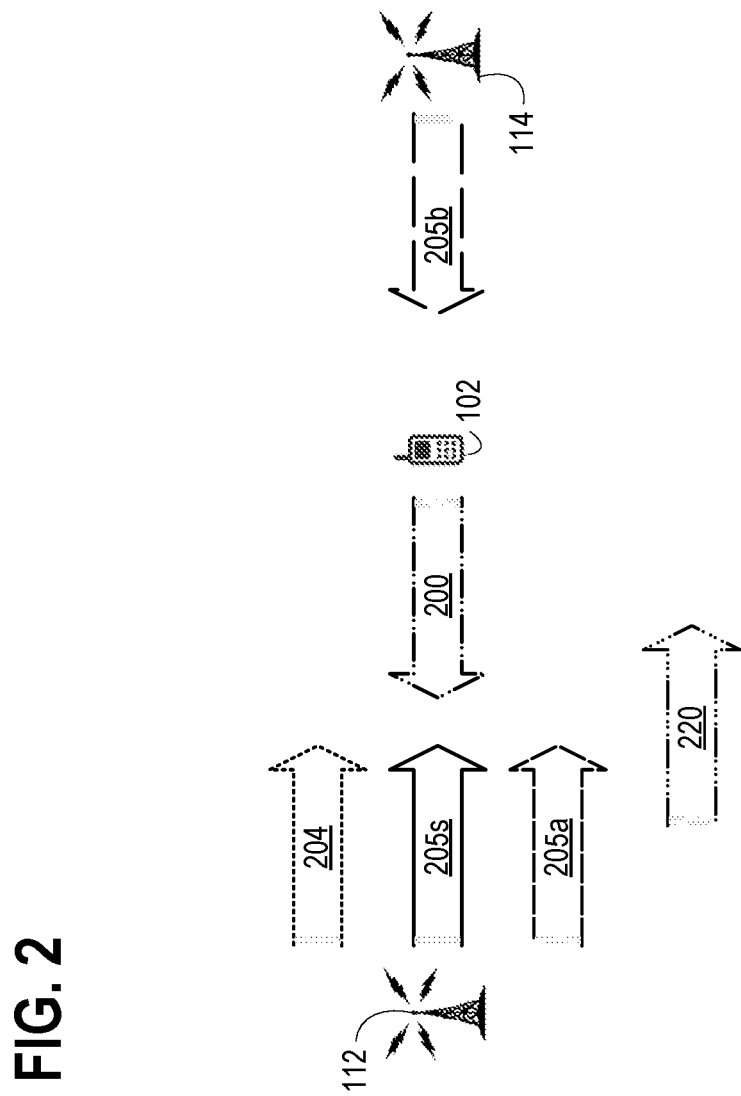
FIG. 2 illustrates signals and a message associated with the arrangement of FIG. 1.

FIG. 2 illustrates signals and a message associated with arrangement 100. UE 102 is able to receive a signal 205s from serving cell 105s, a signal 204 from cell 104, a signal 205a from cell 105a, and a signal 205b from cell 105b. UE 102 is able to measure signal power levels for each of signals 205s, 204, 205a, and 205b to determine RSRP, RSRQ, and/or SINR for each. When a received signal measurement for serving cell 105s meets certain criteria, which may be set by wireless network 110, UE 102 will generate and send an event report to wireless network 110 (e.g., to gNB 112). The criteria for a handover request may be that a received signal measurement for a neighbor 5G cell (e.g., call 105a or cell 105b) exceeds the received signal measurement for serving cell 105s by an offset threshold, and the criteria for an offloading request may be that the received signal measurement for serving cell 105s is below a threshold.

Example thresholds may be an offset of 30 decibels-milliwatt (dBm) for a handover threshold and −120 dBm for an offloading threshold. The threshold values may vary be set by network operators and pushed to UEs, and thus may vary among different wireless networks. Any of RSRP, RSRQ, and SINR may be used for the thresholds. In some examples, different thresholds may be used for different cellular technology generations and intra-system versus inter-system reports. UEs may delay generating and sending event reports due to imposed hysteresis conditions, in order to prevent reporting conditions that might be rapidly reversed.

Different event reports may be used for (interpreted as or part of) handover requests: A3 for inter-frequency handover, A5 for intra-frequency, and B1 and B2 for inter-system handover. B1 is triggered when a neighboring inter-system cell becomes better than a threshold, and B2 is triggered when the serving cell becomes worse than one threshold-1, while a neighboring inter-system cell becomes better than another threshold. An A2 event reports may be used for (interpreted as or part of) an offloading request.

An example A3 event report, transmitted as a message 200, and which may be received by gBN 112, that results in no handover being performed, is: GNB <------------------ UE|RRC||UL_DCCH|measurementReport|{eventId: 3005, ueTraceId: "7a50bdd0144b99f7", measResults: "{measId: 1, measResultServingMOList: [{servCellId: 0, measResultServingCell: {physCellId: 328, measResult: {cellResults: {resultsSSB-Cell: {rsrp: −125 dBm<=RSRP<−124 dBm(32), rsrq: −26.5 dBm<=RSRQ<−26.0 dBm(34), sinr: −15.0 dB<=SINR<−14.5 dB(17)}}}}}], measResultNeighCells: {measResultListNR: [{physCellId: 51, measResult: {cellResults: {resultsSSB-Cell: {rsrp: −93 dBm<=RSRP<−92 dBm(64), rsrq: −18.0 dBm<=RSRQ<−17.5 dBm(51), sinr: −7.0 dB<=SINR<−6.5 dB (33)}}}}]}}"}.

Wireless network 110 determines that a handover to the identified neighbor cell ("NeighCell" with a cell identification (ID) "physCellId: 51") will not be performed, and generates the event report: PROC<--------------> PROC| [SYSTEM_EVENT] ||cuCpMeasurementReportSaEval|||{ueTraceId: "7a50bdd0144b99f7", gnbId: (1846850, 1846850), gnbIdLength: 24, nci: 7564697601, eventMeasurementReport: EVENT_MEASUREMENT_REPORT_A3, measurementName: MEASUREMENT_NAME_BETTER_INTRA_FREQ_P_CELL, action: ACTION_NO_ACTION, measId: 1}

An example A2 event report that would result in triggering an offload from gNB 112: GNB <------------------ UE|RRC||UL_DCCH|measurementReport|{ueTraceId: "483589ce4637c710", measResults: "{measId: 3, measResultServingMOList: [{servCellId: 0, measResultServingCell: {physCellId: 346, measResult: {cellResults: {resultsSSB-Cell: {rsrp: −128 dBm<=RSRP<−127 dBm(29), rsrq: −30.5 dBm<=RSRQ<−30.0 dBm(26), sinr: −15.0 dB<=SINR<−14.5 dB(17)}}}}}]}"}.

However, by the time UE 102 could transmit this A2 event report, UE 102 might have dropped a call (due to signals 205s worsening). Thus, according to aspects of the disclosure, wireless network 110 advantageously leverages the 'measResultServingCell' values from the A3 event report in message 200, rather than waiting for an A2 report. Based on at least the information regarding the serving cell (e.g., the 'measResultServingCell' values), wireless network 110 responds with a message 220, triggering an offload from serving 5G cell 105s to 4G cell 104: GNB ------------------> UE|RRC||DL DCCH|rrcRelease|{ueTraceId: "483589ce4637c710", redirectedCarrierInfo: "{eutra: {eutraFrequency: 68886}}"}

Figure 3:
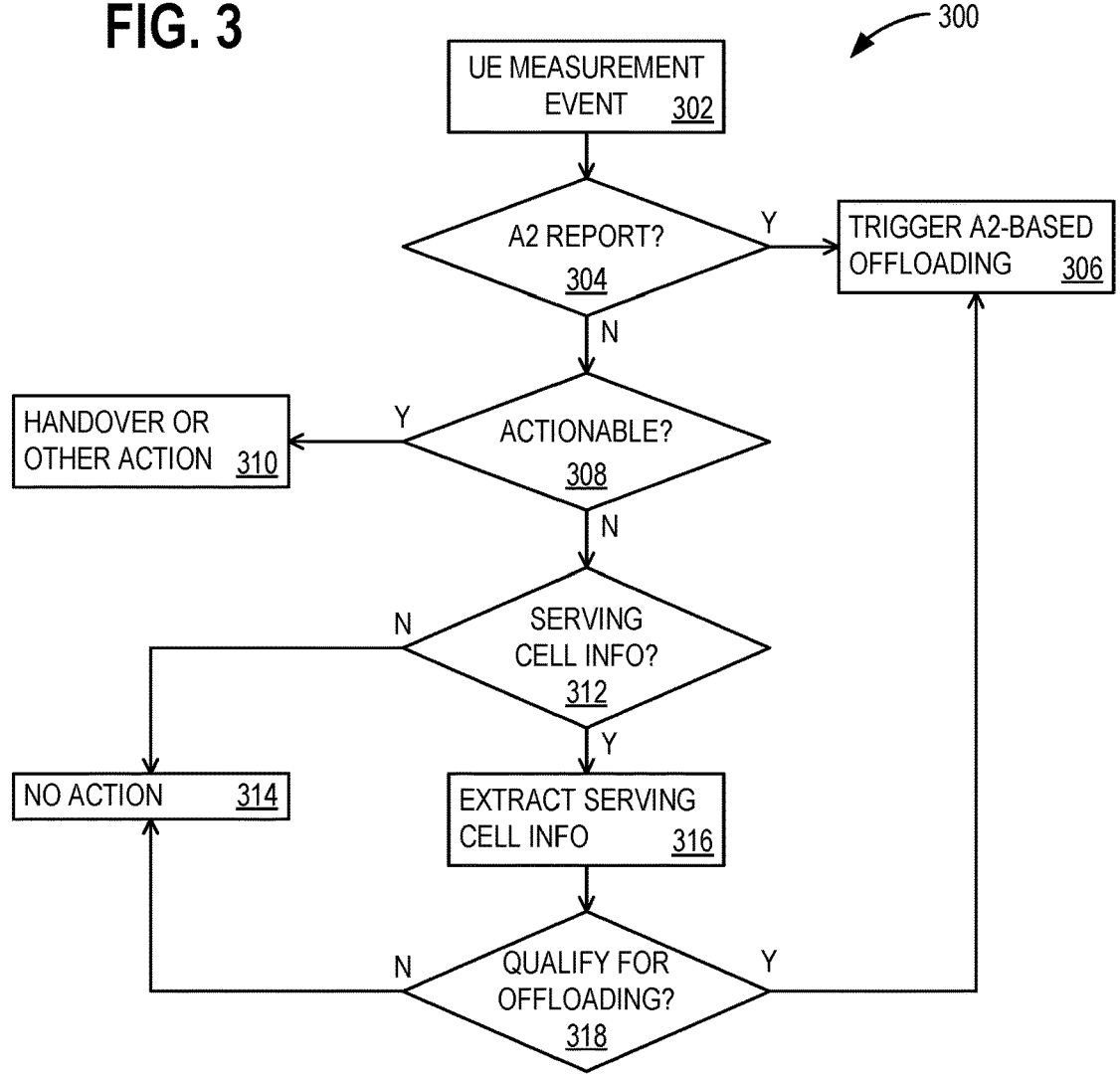
FIG. 3 illustrates an example algorithm for early cellular offloading on a handover request with the arrangement of FIG. 1.

FIG. 3 illustrates an example algorithm 300 for early cellular offloading on a handover request with arrangement 100. A UE measurement event occurs and a report is transmitted to wireless network 110 (e.g., gNB 112) at box 302. If it is an A2 event report, as determined at decision 304, A2-based offloading is triggered at box 306. Otherwise (e.g., it is an A3 event report or other handover request), decision 308 determines whether it is actionable—as a handover request (or other action). If so, a handover or other action is triggered at box 310.

Otherwise (e.g., it is an A3 event report or other handover request but a handover will not be performed), a decision 312 determines whether the message contains sufficient information regarding the serving cell to take other remedial action (e.g., an offload). If not, algorithm 300 moves to box 314 and takes no action. If, however, the message does contain sufficient information regarding the serving cell, algorithm extracts the information regarding the serving cell at box 316.

Algorithm 300 then determines whether offloading is warranted (e.g., the received signal measurement for the serving cell is below a threshold) at decision 318. If an offload is not warranted, algorithm 300 moves to box 314 and takes no action. If, however, an offload is warranted, algorithm 300 moves to box 306 to trigger an offload.

Figure 4:
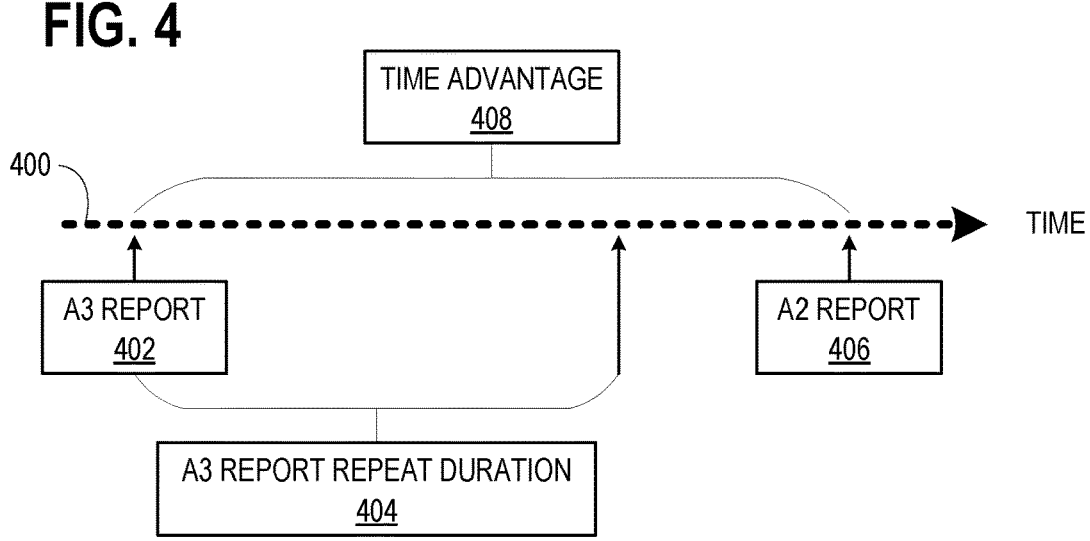
FIG. 4 illustrates an example timeline that shows the advantageous operation of early cellular offloading on a handover request with the arrangement of FIG. 1.

FIG. 4 illustrates an example timeline 400 that shows the advantageous operation of early cellular offloading on a handover request with arrangement 100. UE transmits the A3 event report as message 200 at a time 402 and is programmed to continue repeat sending A3 event reports for a time duration 404. Due to its programming, UE 102 will not send an A2 event report until a time 402. However, wireless network 110, after determining not to permit a handover, effectively treats the A3 event report of message 200 as an A2 report, and triggers the offload based on the A3 event report at time 402. This provides a time advantage 408 of the difference between time 406 and time 402.

Figure 5:
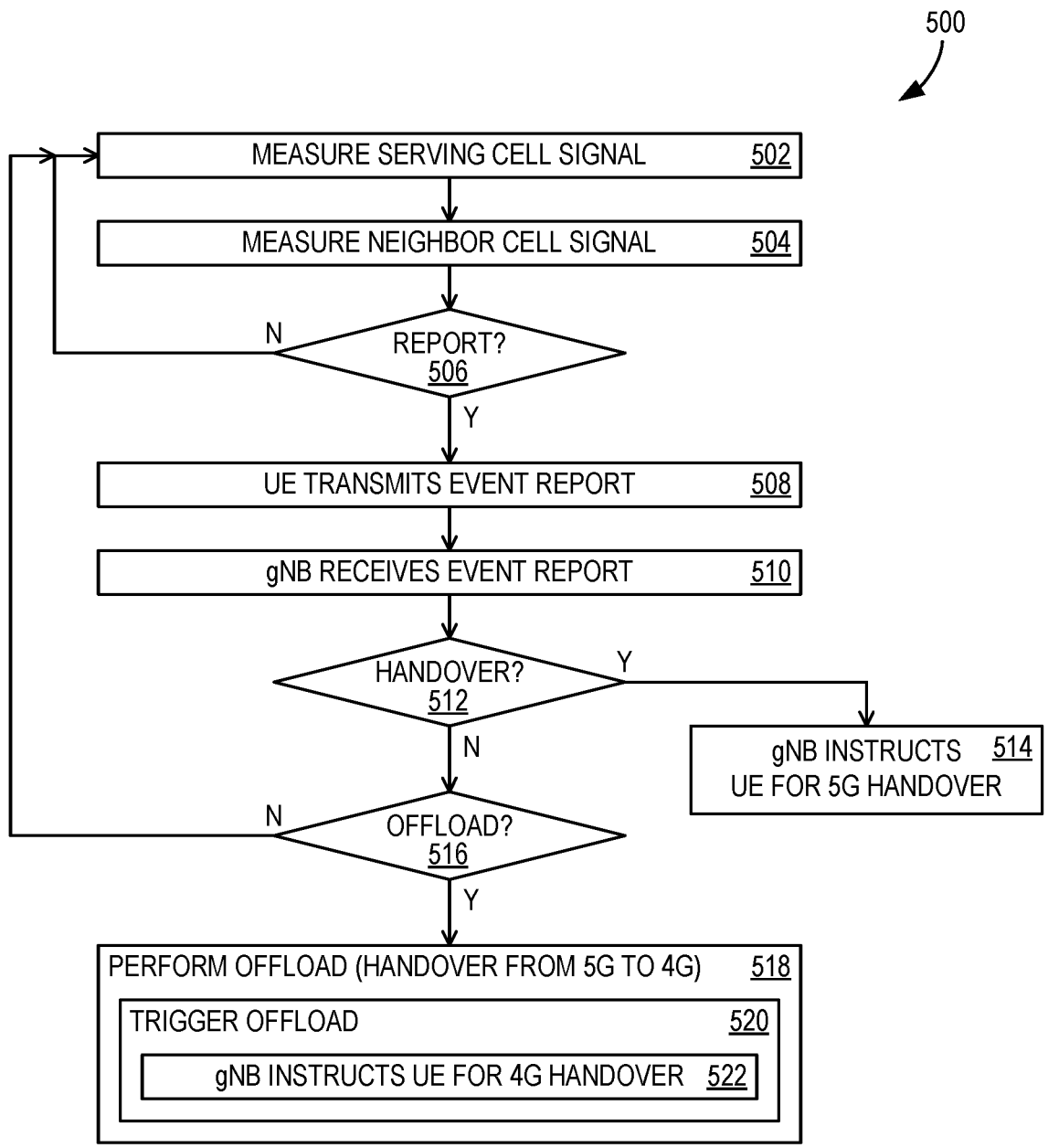
FIG. 5 illustrates a flowchart of exemplary operations associated with examples of the arrangement of FIG. 1.

FIG. 5 illustrates a flowchart 500 of exemplary operations associated with examples of arrangement 100. In some examples, at least a portion of flowchart 500 may each be performed using one or more computing devices 700 of FIG. 7. Flowchart 500 commences with UE 102 measuring signal 205s from serving cell 105s in operation 502 and measuring signal 205a from neighbor cell 105a and/or signal 205b from neighbor cell 105b in operation 504. UE 102 determines whether to request a handover in decision operation 506. If not, flowchart 500 returns to operation 502.

Otherwise, UE 102 transmits message 200 (e.g., an A3, A5, B1, or B2 event report) to wireless network 110 in operation 508. Operation 510 includes receiving, at a node (e.g., gBN 112) of wireless network 110, from UE 102, message 200 containing information regarding a serving cell of a first wireless technology generation and information regarding a neighbor cell of the first wireless technology generation. In some examples, message 200 comprises a handover request or is otherwise associated with (or interpreted as) a handover request. In some examples, message 200 comprises at least one report selected from the list consisting of: an A3 event report, an A5 event report, a B1 event report, and a B2 event report. In some examples, the first wireless technology generation comprises 5G. In some examples, the second wireless technology generation comprises 4G. In some examples, the first wireless technology generation comprises 6G and the second wireless technology generation comprises 5G.

In some examples, the information regarding the serving cell comprises a received signal measurement for the serving cell. In some examples, the information regarding the neighbor cell comprises a received signal measurement for the neighbor cell and a cell ID of the neighbor cell. In some examples, the received signal measurement for the serving cell and the received signal measurement for the neighbor cell each comprises a metric selected from the list consisting of: RSRP, RSRQ, and SINR. In some examples, the node of wireless network 110 that receives message 200 comprises a gNB.

Decision operation 512 determines whether a handover to the neighbor cell will be performed. If so, gNB 112 instructs UE 102, and the handover is performed in operation 514. Following flowchart 500 to decision operation 516, however, decision operation 512 had determined that a handover to the neighbor cell will not be performed. In some examples, determining that the handover to the neighbor cell will not be performed is due to at least loading of the neighbor cell. In some examples, determining that the handover to the neighbor cell will not be performed is due to at least the received signal measurement for the serving cell not meeting a threshold level for a handover. This may occur, for example, if the offset for the neighbor cell met the threshold for UE 102 to request a handover, but the received signal power from the neighbor cell is still too low for wireless network 110 to permit the neighbor cell to accept the handover.

In accordance with algorithm 300, described above, decision operation 516 determines whether to trigger offloading (e.g., from 5G to 4G). In some examples, triggering an offload is based on at least the information regarding the serving cell indicating that the received signal measurement for the serving cell is below an offloading threshold. In some examples, triggering an offload is based on at least UE capability information 132 indicating that UE 102 is able to use the other wireless technology generation. If an offload is not warranted (or supported by UE 102), flowchart 500 returns to operation 502.

Otherwise, operation 518 performs a handover of UE 102 from serving cell 105s to cell 104 of the second wireless technology generation (4G). Operation 518 is performed using operations 520 and 522. Operation 520 includes, based on at least the information regarding serving cell 105s (e.g., indicating that the received signal measurement for serving cell 105s is below an offloading threshold) and determining that the handover to the neighbor cell (e.g., cell 105a or 105b) will not be performed, triggering an offload from serving cell 105s to cell 104 of the second wireless technology generation. In some examples, triggering the offload comprises triggering the offload prior to receiving an A2 event report from UE 102. Operation 522 includes transmitting from the node (e.g., gNB 112) of wireless network 110, message 220 instructing UE 102 to move to cell 104 of the second wireless technology generation (or to search for a suitable cell of the second wireless technology generation).

Figure 6:
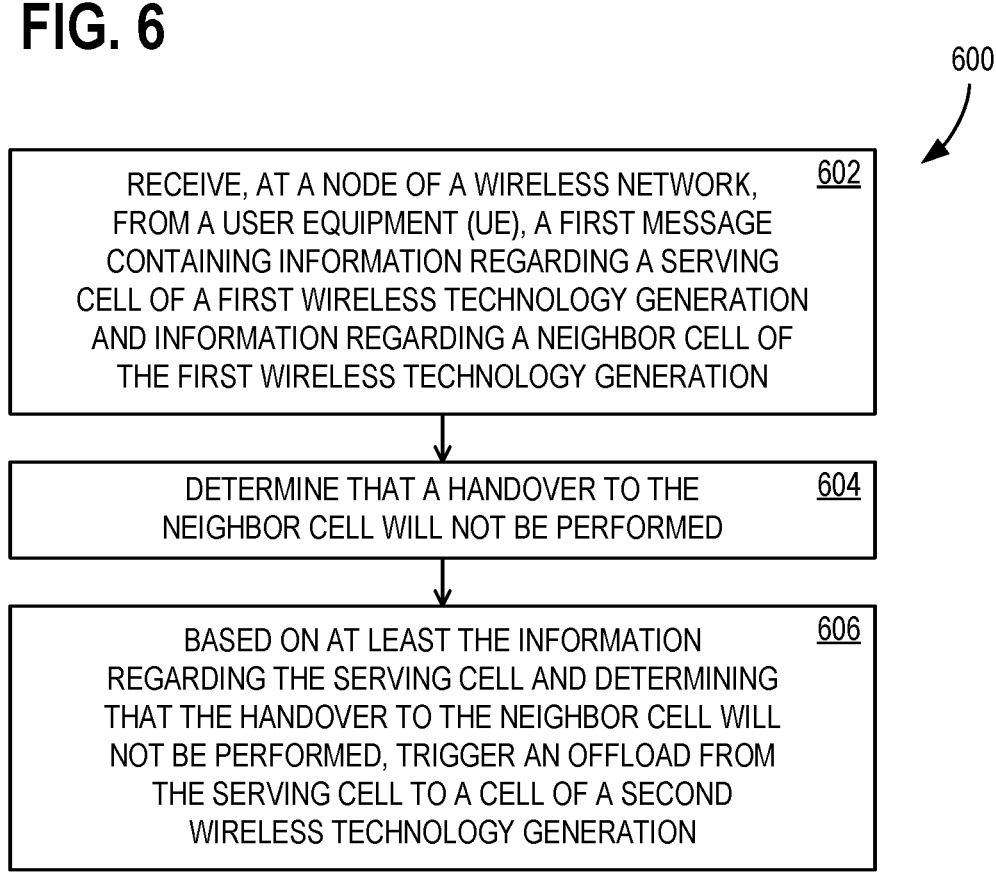
FIG. 6 illustrates another flowchart of exemplary operations associated with examples of the arrangement of FIG. 1.

FIG. 6 illustrates a flowchart 600 of exemplary operations associated with examples of arrangement 100. In some examples, at least a portion of flowchart 600 may each be performed using one or more computing devices 700 of FIG. 7. Flowchart 600 commences with operation 602, which includes receiving, at a node of a wireless network, from a UE, a first message containing information regarding a serving cell of a first wireless technology generation and information regarding a neighbor cell of the first wireless technology generation. Operation 604 includes determining that a handover to the neighbor cell will not be performed. Operation 606 includes, based on at least the information regarding the serving cell and determining that the handover to the neighbor cell will not be performed, triggering an offload from the serving cell to a cell of a second wireless technology generation.

Figure 7:
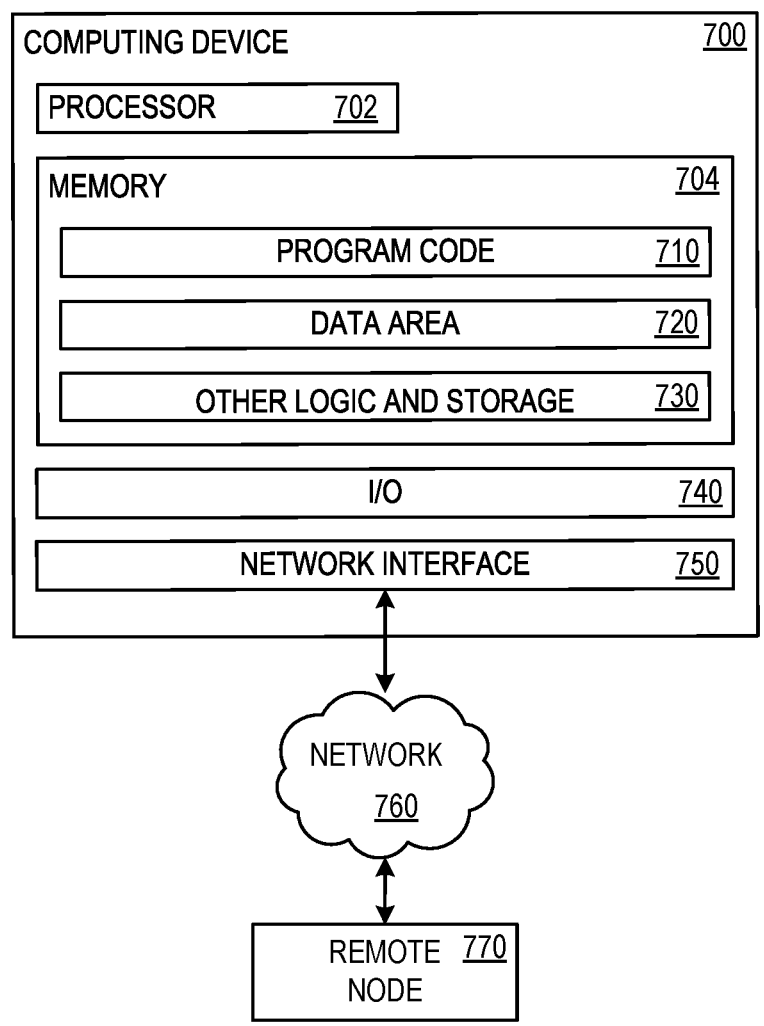
FIG. 7 illustrates a block diagram of a computing device suitable for implementing various aspects of the disclosure.

FIG. 7 illustrates a block diagram of computing device 700 that may be used as a component of arrangement 100, for example, as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including any instructions necessary to perform operations described herein. Data area 720 holds any data necessary to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over a network 760 with a remote node 770, which may represent another implementation of computing device 700.

ADDITIONAL EXAMPLES

An example method of providing wireless service comprises: receiving, at a node of a wireless network, from a UE, a first message containing information regarding a serving cell of a first wireless technology generation and information regarding a neighbor cell of the first wireless technology generation; determining that a handover to the neighbor cell will not be performed; and based on at least the information regarding the serving cell and determining that the handover to the neighbor cell will not be performed, triggering an offload from the serving cell to a cell of a second wireless technology generation.

An example system for providing wireless service comprises: a processor; and a computer-readable medium storing instructions that are operative upon execution by the processor to: receive, at a node of a wireless network, from a UE, a first message containing information regarding a serving cell of a first wireless technology generation and information regarding a neighbor cell of the first wireless technology generation; determine that a handover to the neighbor cell will not be performed; and based on at least the information regarding the serving cell and determining that the handover to the neighbor cell will not be performed, trigger an offload from the serving cell to a cell of a second wireless technology generation.

One or more example computer storage devices has computer-executable instructions stored thereon, which, upon execution by a computer, cause the computer to perform operations comprising: receiving, at a node of a wireless network, from a UE, a first message containing information regarding a serving cell of a first wireless technology generation and information regarding a neighbor cell of the first wireless technology generation; determining that a handover to the neighbor cell will not be performed; and based on at least the information regarding the serving cell and determining that the handover to the neighbor cell will not be performed, triggering an offload from the serving cell to a cell of a second wireless technology generation.

Alternatively, or in addition to the other examples described herein, examples include any combination of the following:
    the node of the wireless network that receives the first message comprises a gNB;
    the first wireless technology generation comprises 5G;
    second wireless technology generation comprises 4G;
    the first message comprises at least one report selected from the list consisting of: an A3 event report, an A5 event report, a B1 event report, and a B2 event report;
    the information regarding the serving cell comprises a received signal measurement for the serving cell;

the information regarding the neighbor cell comprises a received signal measurement for the neighbor cell and a cell ID of the neighbor cell;

the received signal measurement for the serving cell and the received signal measurement for the neighbor cell each comprises a metric selected from the list consisting of: RSRP, RSRQ, and SINR;

determining that the handover to the neighbor cell will not be performed due to at least loading of the neighbor cell;

determining that the handover to the neighbor cell will not be performed due at least the received signal measurement for the serving cell not meeting a threshold level for a handover;

triggering the offload based on at least the information regarding the serving cell indicating that the received signal measurement for the serving cell is below an offloading threshold;

transmitting from the node of a wireless network, a second message instructing the UE to move to the cell of the second wireless technology generation;

performing a handover of the UE from the serving cell to the cell of the second wireless technology generation;

triggering the offload comprises triggering the offload prior to receiving an A2 event report;

the first message is associated with a handover request;

the first message comprises a handover request;

the first wireless technology generation comprises 6G; and the second wireless technology generation comprises 5G.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing wireless service, the method comprising:

receiving, at a node of a wireless network, from a user equipment (UE), a first message containing information regarding a serving cell of a first wireless technology generation and information regarding a neighbor cell of the first wireless technology generation, the serving cell provided by the node of the wireless network and the neighbor cell provided by another node of the wireless network;

determining that a handover to the neighbor cell will not be performed; and based on at least the information regarding the serving cell and determining that the handover to the neighbor cell will not be performed, triggering an offload from the serving cell to a co-located serving cell of a second wireless technology generation provided by the node of the wireless network.

2. The method of claim 1, wherein the first wireless technology generation comprises fifth generation cellular technology (5G), and the second wireless technology generation comprises fourth generation cellular technology (4G).

3. The method of claim 1, wherein the first message comprises at least one report selected from the list consisting of: an A3 event report, an A5 event report, a B1 event report, and a B2 event report.

4. The method of claim 1, wherein the information regarding the serving cell comprises a received signal measurement for the serving cell, and wherein the information regarding the neighbor cell comprises a received signal measurement for the neighbor cell and a cell identification (ID) of the neighbor cell.

5. The method of claim 4, wherein the received signal measurement for the serving cell and the received signal measurement for the neighbor cell each comprises a metric selected from the list consisting of:

reference signal receive power (RSRP), reference signal received quality (RSRQ), and signal to interference and noise ratio (SINR).

6. The method of claim 1, wherein triggering the offload comprises:

transmitting from the node of a wireless network, a second message instructing the UE to move to the co-located serving cell of the second wireless technology generation.

7. The method of claim 1, further comprising:

performing a handover of the UE from the serving cell to the co-located serving cell of the second wireless technology generation.

8. A system for providing wireless service, the system comprising:

a processor; and a non-transitory computer-readable medium storing instructions that are operative upon execution by the processor to:

receive, at a node of a wireless network, from a user equipment (UE), a first message containing information regarding a serving cell of a first wireless technology generation and information regarding a neighbor cell of the first wireless technology generation, the serving cell provided by the node of the wireless network and the neighbor cell provided by another node of the wireless network;

determine that a handover to the neighbor cell will not be performed; and based on at least the information regarding the serving cell and determining that the handover to the neighbor cell will not be performed, trigger an offload from the serving cell to a co-located serving cell of a second wireless technology generation provided by the node of the wireless network.

9. The system of claim 8, wherein the first wireless technology generation comprises fifth generation cellular technology (5G), and the second wireless technology generation comprises fourth generation cellular technology (4G).

10. The system of claim 8, wherein the first message comprises at least one report selected from the list consisting of:
an A3 event report, an A5 event report, a B1 event report, and a B2 event report.

11. The system of claim 8, wherein the information regarding the serving cell comprises a received signal measurement for the serving cell, and wherein the information regarding the neighbor cell comprises a received signal measurement for the neighbor cell and a cell identification (ID) of the neighbor cell.

12. The system of claim 11, wherein the received signal measurement for the serving cell and the received signal measurement for the neighbor cell each comprises a metric selected from the list consisting of:
reference signal receive power (RSRP), reference signal received quality (RSRQ), and signal to interference and noise ratio (SINR).

13. The system of claim 8, wherein triggering the offload comprises:
transmitting from the node of the wireless network, a second message instructing the UE to move to the co-located serving cell of the second wireless technology generation.

14. The system of claim 8, wherein the operations are further operative to:
performing a handover of the UE from the serving cell to the co-located serving cell of the second wireless technology generation.

15. One or more computer storage devices having computer-executable instructions stored thereon, which, upon execution by a computer, cause the computer to perform operations comprising:
receiving, at a node of a wireless network, from a user equipment (UE), a first message containing information regarding a serving cell of a first wireless technology generation and information regarding a neighbor cell of the first wireless technology generation, the serving cell provided by the node of the wireless network and the neighbor cell provided by another node of the wireless network;
determining that a handover to the neighbor cell will not be performed; and
based on at least the information regarding the serving cell and determining that the handover to the neighbor cell will not be performed, triggering an offload from the serving cell to a co-located serving cell of a second wireless technology generation provided by the node of the wireless network.

16. The one or more computer storage devices of claim 15, wherein the first wireless technology generation comprises fifth generation cellular technology (5G), and the second wireless technology generation comprises fourth generation cellular technology (4G).

17. The one or more computer storage devices of claim 15, wherein the first message comprises at least one report selected from the list consisting of:
an A3 event report, an A5 event report, a B1 event report, and a B2 event report.

18. The one or more computer storage devices of claim 15, wherein the information regarding the serving cell comprises a received signal measurement for the serving cell, and wherein the information regarding the neighbor cell comprises a received signal measurement for the neighbor cell and a cell identification (ID) of the neighbor cell.

19. The one or more computer storage devices of claim 18, wherein the received signal measurement for the serving cell and the received signal measurement for the neighbor cell each comprises a metric selected from the list consisting of:
reference signal receive power (RSRP), reference signal received quality (RSRQ), and signal to interference and noise ratio (SINR).

20. The one or more computer storage devices of claim 15, wherein the operations further comprise:
performing a handover of the UE from the serving cell to the co-located serving cell of the second wireless technology generation.

* * * * *